(12) United States Patent
Mao et al.

(10) Patent No.: US 9,317,144 B2
(45) Date of Patent: Apr. 19, 2016

(54) ELECTRONIC DEVICE, HANDWRITING INPUT RECOGNITION SYSTEM, AND METHOD FOR RECOGNIZING HANDWRITTEN INPUT THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hai-Jun Mao, Shenzhen (CN); Te-Jia Liu, Shenzhen (CN); Hai-Sen Liang, Shenzhen (CN); Hua-Dong Cheng, Shenzhen (CN); Chih-San Chiang, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 223 days.

(21) Appl. No.: 14/141,440

(22) Filed: Dec. 27, 2013

(65) Prior Publication Data
US 2014/0184542 A1  Jul. 3, 2014

(30) Foreign Application Priority Data

Dec. 27, 2012  (CN) .......................... 2012 1 0577313

(51) Int. Cl.
*G06F 3/041* (2006.01)
*G06F 3/0354* (2013.01)
*G06F 3/0488* (2013.01)

(52) U.S. Cl.
CPC ........ *G06F 3/03545* (2013.01); *G06F 3/04883* (2013.01)

(58) Field of Classification Search
CPC ...... G06K 11/06; G06F 3/048; G06F 3/04883
See application file for complete search history.

(56) References Cited

U.S. PATENT DOCUMENTS

| 6,408,092 B1 * | 6/2002 | Sites ................... | G06F 3/04883 345/158 |
| 2004/0104936 A1 * | 6/2004 | Guo ..................... | G06F 3/04883 715/764 |
| 2005/0099407 A1 * | 5/2005 | Pennington .......... | G06F 3/04883 345/179 |

FOREIGN PATENT DOCUMENTS

| CN | 101639761 A * | 2/2010 |
| TW | 201025081 A1 | 7/2010 |

* cited by examiner

*Primary Examiner* — Carolyn R Edwards
(74) *Attorney, Agent, or Firm* — Novak Druce Connolly Bove + Quigg LLP

(57) ABSTRACT

A handwriting input recognizing method comprises following steps. Recognize an initial touch point of a touch. Determine an input region associated with the initial touch point. Display the input region. Recognize and display a handwritten input in the input region. Determine whether there is a handwritten input reaches the boundary of the input region. If yes, recognize and display the letters associated with the handwritten input and determine whether the input region receives another handwritten input during a predefined time duration. If yes, determine the sting of letters associated with the handwritten input is a first portion of a complete word, and the sting of letters associated with the another handwritten input is a last portion of the complete word. Combine the first portion and the last portion into a complete word. display letters of the first portion and the last portion in a substantially same size.

20 Claims, 6 Drawing Sheets

ELECTRONIC DEVICE, HANDWRITING INPUT RECOGNITION SYSTEM, AND METHOD FOR RECOGNIZING HANDWRITTEN INPUT THEREOF

BACKGROUND

1. Technical Field

The present disclosure relates to an electronic device, a handwriting input recognition system, and a method for recognizing handwritten input thereof.

2. Description of Related Art

Many electronic devices have handwriting input functions. However, sizes of display screens of electronic devices are often too small to input a long word. If a word is too long to handwrite on the display screen, the word may need to be divided into separate parts, which is not aesthetic.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
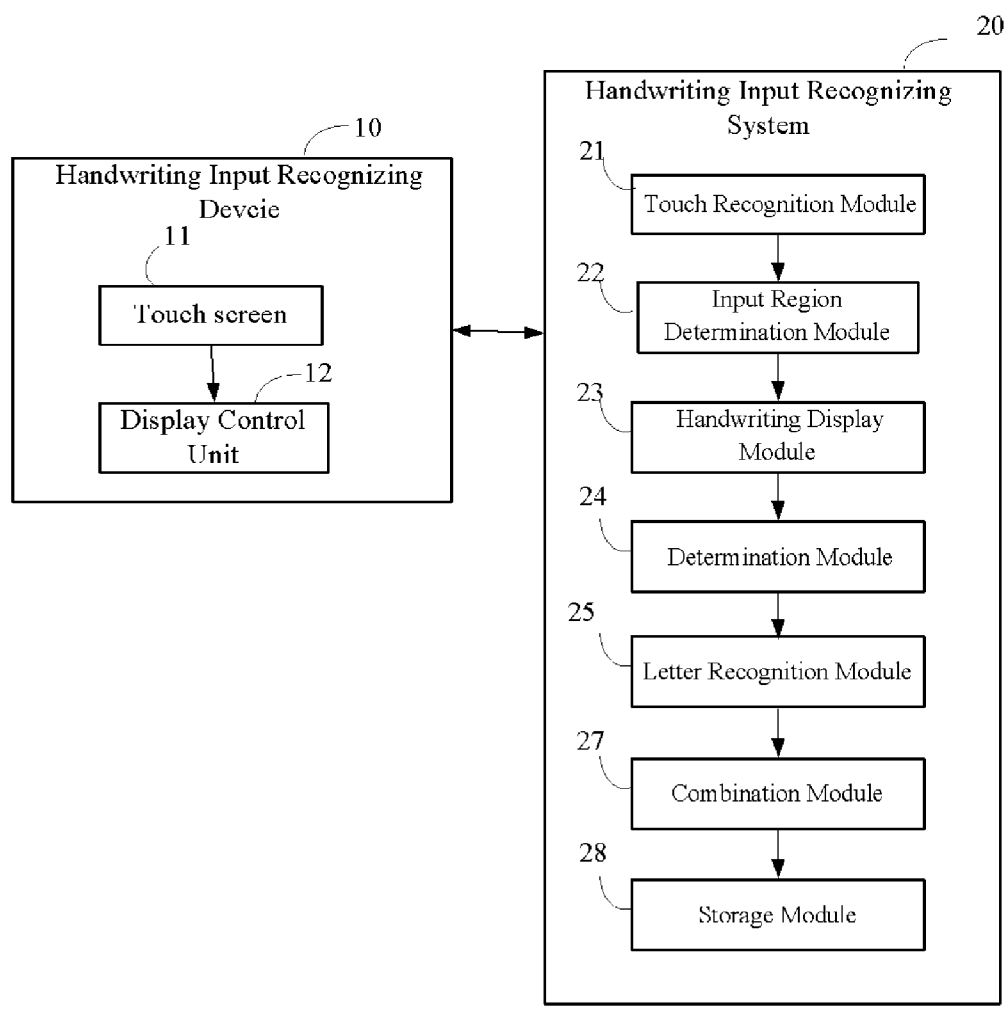
FIG. 1 is a block diagram of an embodiment of an electronic device having a handwriting input recognition system.

FIG. 1 shows an electronic device 10 and a handwriting input recognition system 20. The handwriting input recognition system 20 is applied in the electronic device 10 to allow the electronic device 10 to recognize handwritten input information inputted via a stylus 30 (show in FIGS. 2-4), a finger, or other suitable tool. The electronic device 10 includes a touch screen 11 and a display control unit 12. The electronic device 10 can be, but is not limited to, a mobile phone, a tablet computer, or a personal digital assistant.

The handwriting input recognition system 20 includes a touch recognition module 21, an input region determination module 22, a handwriting display module 23, a determination module 24, a letter recognition module 25, a combination module 27, and a storage module 28.

Figure 2:
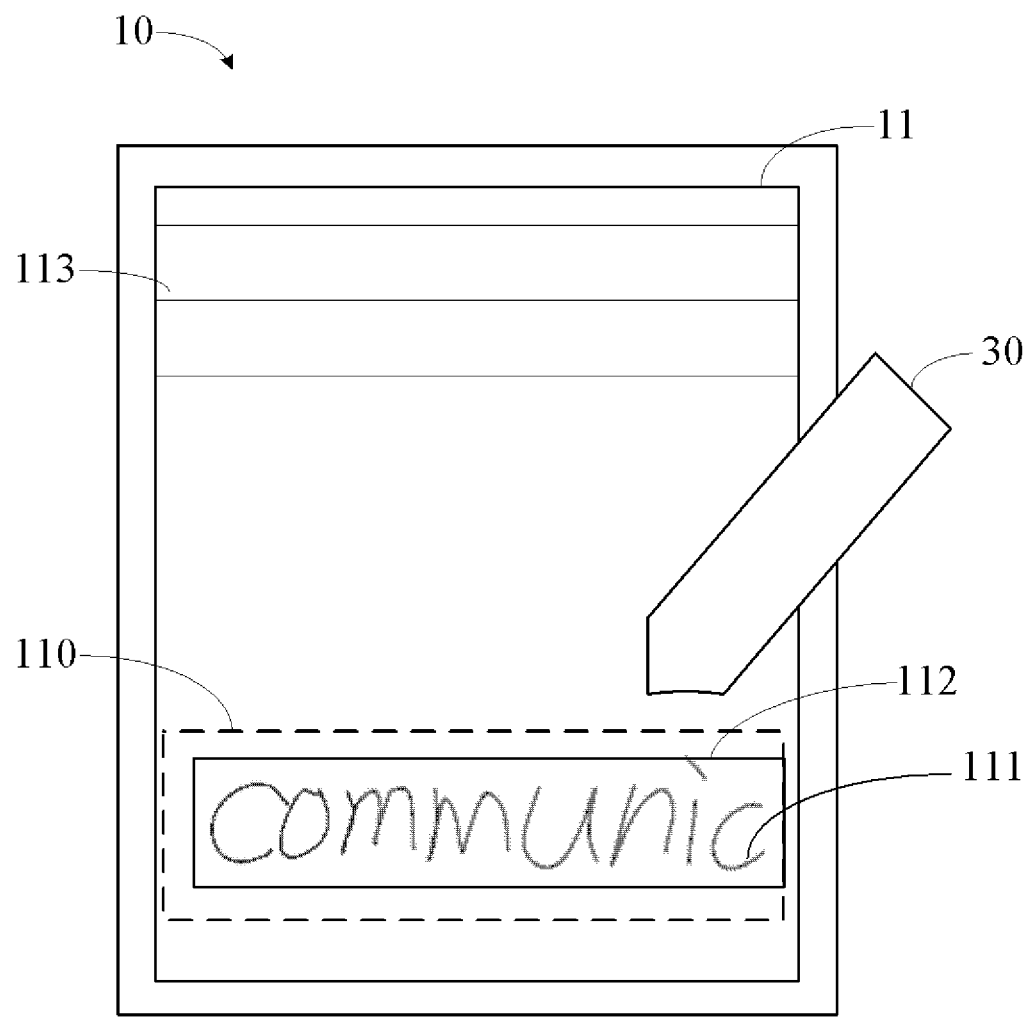
FIG. 2 is a schematic view of an interface of the electronic device of FIG. 1 showing a first portion of a word written therein.

Referring to FIG. 2, when the stylus 30 touches the touch screen 11, the touch recognition module 21 recognizes an initial touch point of the stylus 30. The input region determination module 22 is configured to determine an input region 110 associated with the initial touch point. In the embodiment, the input region determination module 22 determines the input region 110 according to predefined input region determining information. The predefined input region determining information is parameters to define a predefined area surrounding the initial touch point. The parameters to define the predefined area are pre-stored in the storage module 28. The input region determination module 22 is configured to read the parameters and the handwriting display module 23 is configured to display the input region 110 on the touch screen 11. The touch recognition module 21 is further configured to recognize a handwritten input 111 in the input region 110. The handwriting display module 23 is configured to display the handwritten input 111 in the input region 110.

Figure 3:
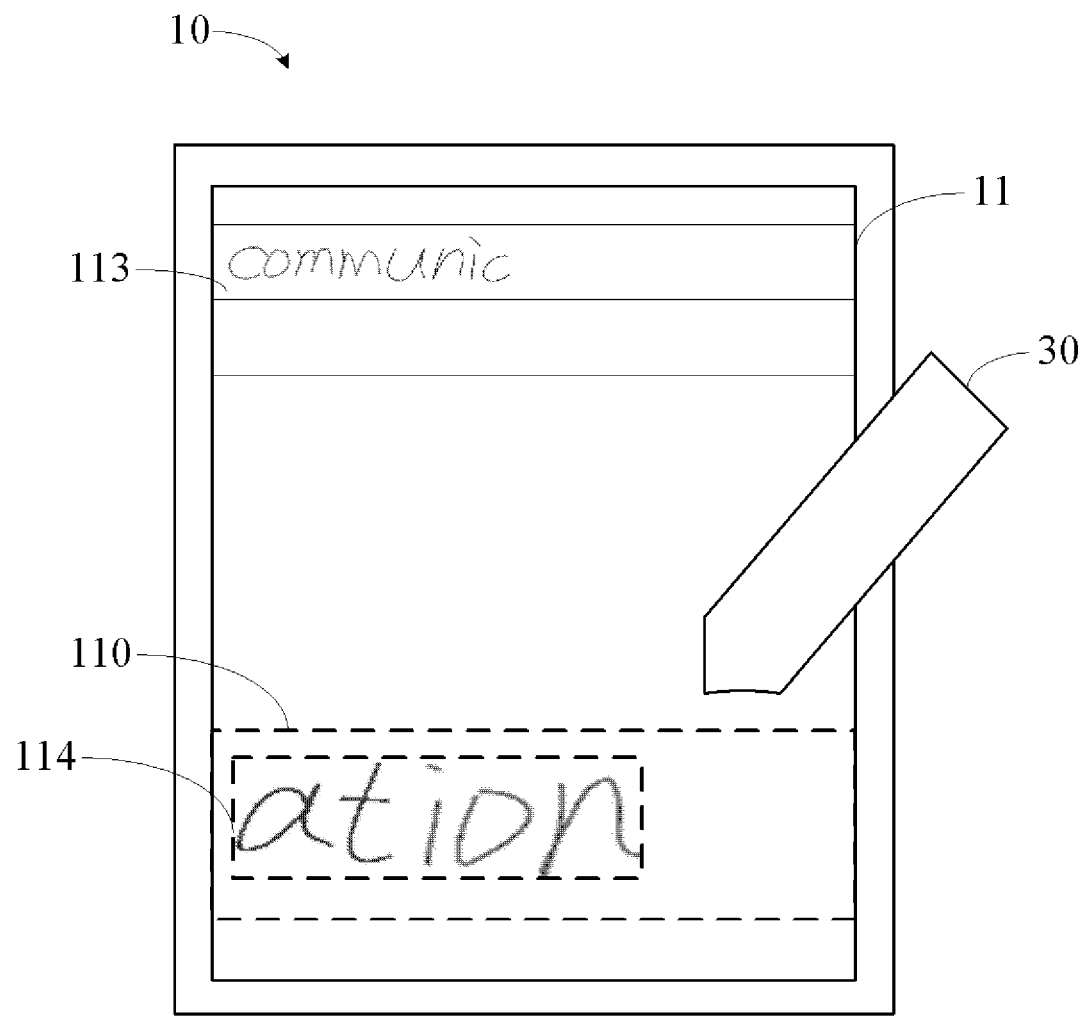
FIG. 3 is similar to FIG. 2, but showing a second portion of the word written therein.

After a handwritten input 111 is stopped being input into the input region 110, the determination module 24 determines whether a another handwritten input 111 continues being input into the input region 110 within a predetermined time duration. If the predetermined time duration passes without the input region 110 receiving another handwritten input 111, the handwriting display module 23 creates a substantially rectangular region 112 for closely bounding the handwritten input 111. In the embodiment, the handwriting display module 23 calculates a maximum height and a maximum width of the handwritten input 111 to create the rectangular region 112. Therefore, sizes of the rectangular regions 112 are different according to different sizes of the recognized handwritten input 111. Referring to FIGS. 2 and 3, a size of a rectangular region 114 bounding the handwritten input 111 is different from the size of the rectangular region 112, because a size of the handwritten input 111 in the input region 110 has changed. The letter recognition module 25 recognizes a string of letters associated with the handwritten input 111 in the input region 110, and the handwriting display module 23 displays the recognized string of letters in a non-input region 113 of the touch screen 11. The handwriting display module 23 further clears the handwritten input 111 from the input region 110 to make room for the stylus 30 to input another handwritten input 111 into the input region 110. If the handwritten input 111 reaches a boundary of the input region 110 (shown in FIG. 2), the handwriting display module 23 immediately displays the handwritten input 111 in the non-input region 113 by following the above-mentioned processes, and clears the handwritten input 111 from the input region 110. The determination module 24 determines whether a another handwritten input 111 is continued to be input within the predetermined time duration. If a another handwritten input 111 is input within the predetermined time duration, the determination module 24 determines that the string of letters associated with the first handwritten input 111 is a first portion of a word, and a string of letters associated with the another handwritten input 111 is a second portion of the word. If a another handwritten input 111 is not input within the predefined time period, the determination module 24 determines that the string of letters associated with the first handwritten input 111 is a complete word or a last portion of a word.

Figure 4:
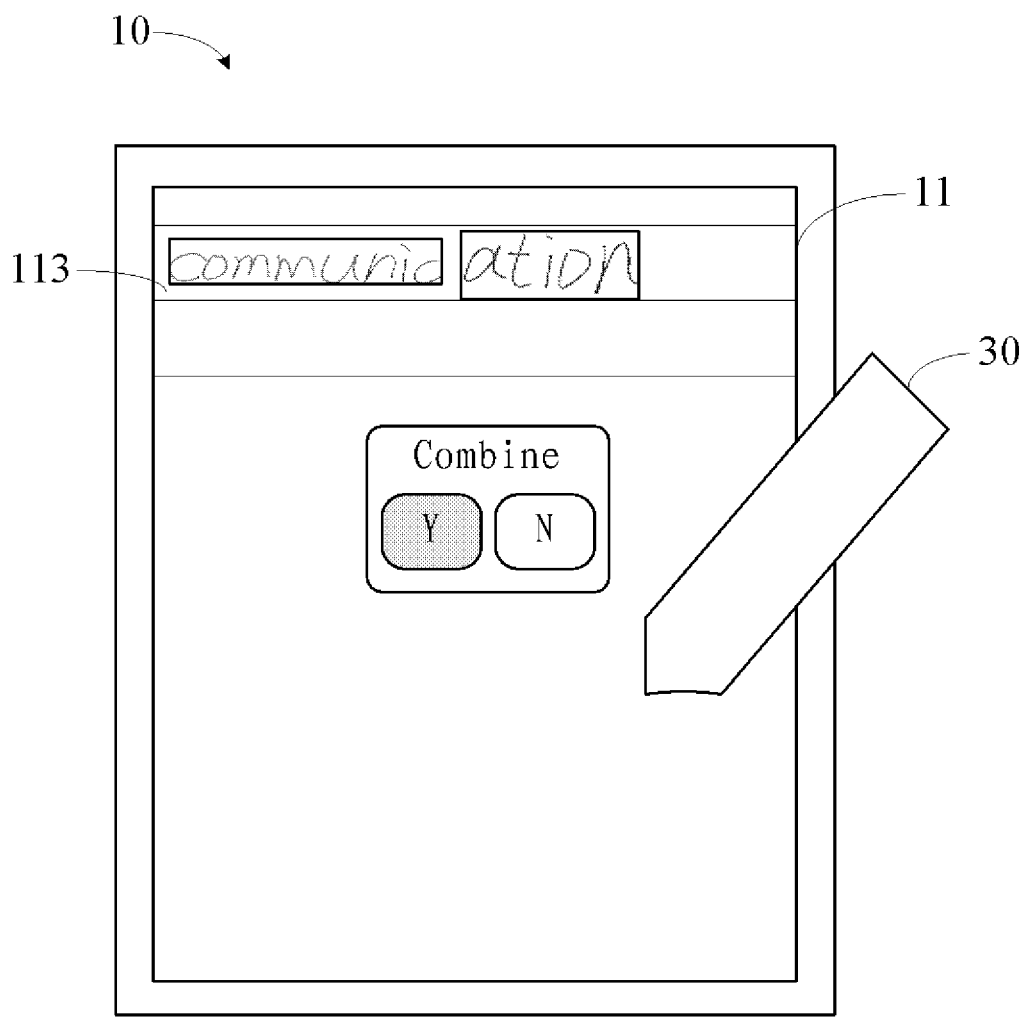
FIG. 4 is similar to FIG. 2, but showing a prompt for combining two portions of the word.
Figure 5:
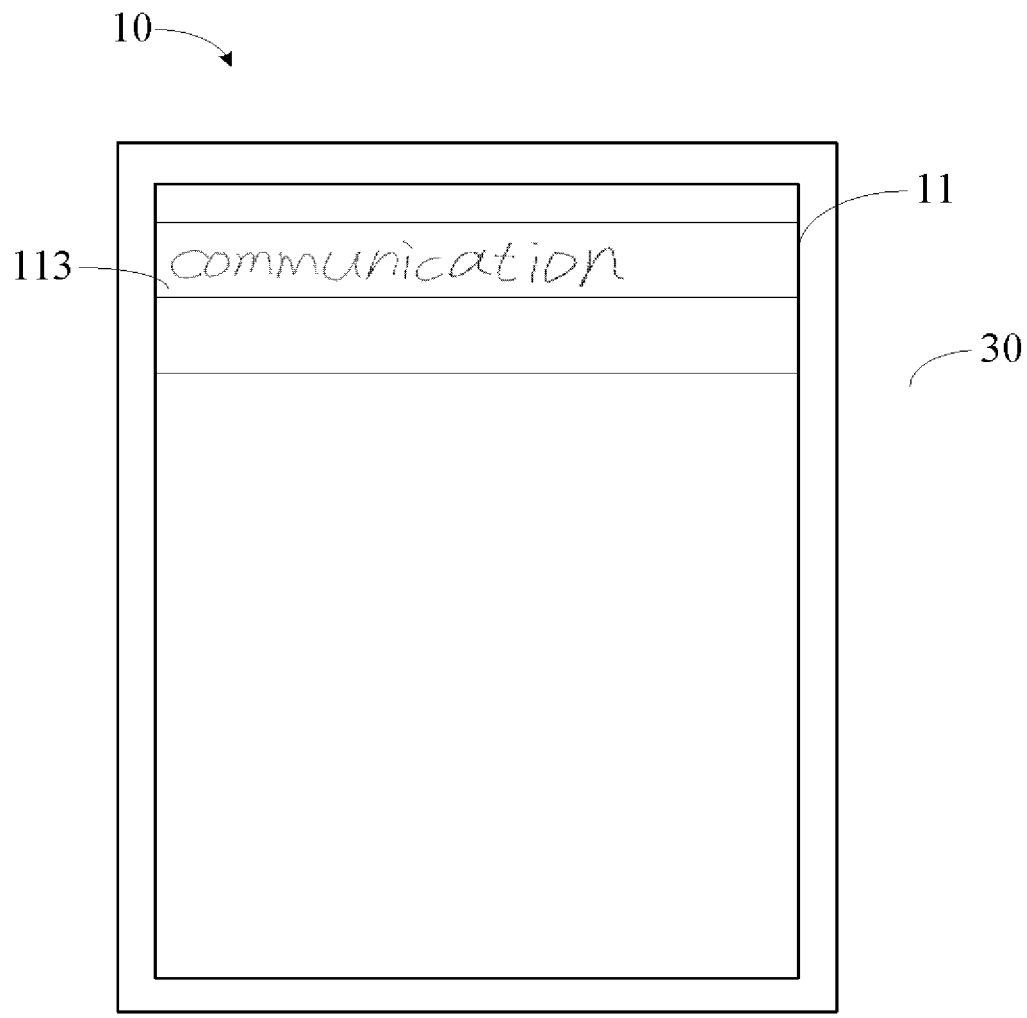
FIG. 5 is a similar to FIG. 2, but showing the two portions of the word combined.

Referring to FIGS. 4-5, the determination module 24 is further configured to generate and display a prompt on the touch screen 11 to prompt a user whether to combine a first portion and a last portion into a word. In the embodiment, the prompt includes "yes" and "no" selection items.

The combination module 27 is configured to combine the first portion and the last portion to form a complete word and display the combined letters in a substantially same size when the user selects the "yes" selection item.

In the embodiment, the combination module 27 further adjusts sizes of the first and second portion and reduces a space between the first and second portion. In one embodiment, the combination module 27 adjusts the sizes of the letters of the combined handwritten letters to a predefined size pre-stored in the storage module 28.

Figure 6:
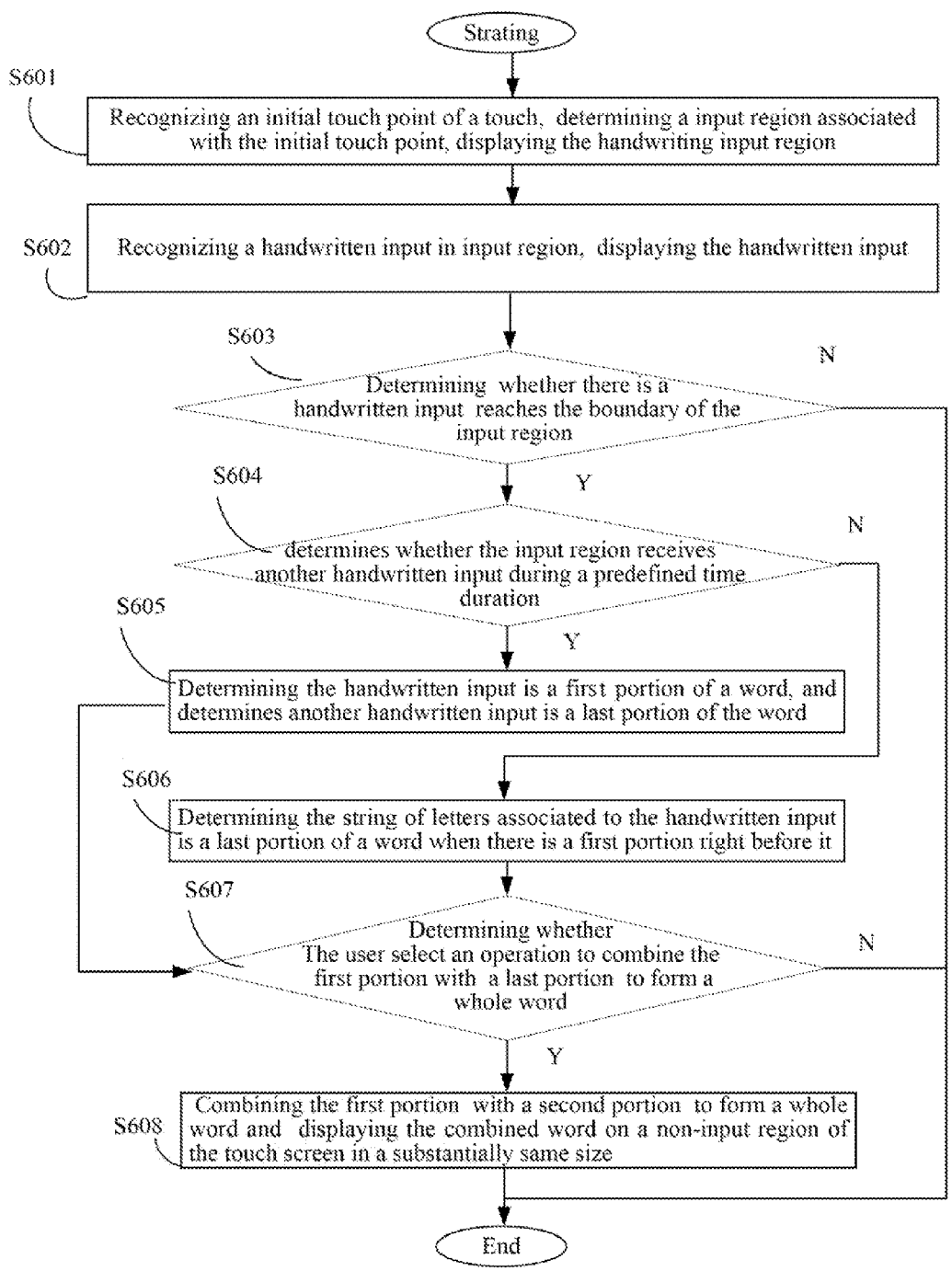
FIG. 6 is a flowchart of an embodiment of a method for recognizing and displaying handwriting input on the touch screen.

FIG. 6 shows a flowchart of a method for recognizing handwritten input by the stylus 30. The method includes following steps:

In step S601, the touch recognition module 21 recognizes an initial touch point of the stylus 30, the input region determination module 22 determines an input region 110 associated with the initial touch point, and the handwriting display module 23 displays the input region 110 on the touch screen 11.

In step S602, the touch recognition module 21 recognizes a handwritten input 111 input in the input region 110, and the handwriting display module 23 controls to display the recognized handwritten input 111 on the input region 110.

In step S603, the determination module 24 determines whether there is the handwritten input reaches the boundary of the input region 110, if yes, the processes goes to step S604, if no, the processes end.

In step S604, the letter recognition module 25 recognizes a string of letters associated with the handwritten input 111 in the input region 110, the handwriting display module 23 displays the recognized string of letters in a non-input region 113 of the touch screen 11, the determination 24 determines whether the input region 110 receives a another handwritten input with a predefined time duration, if yes, the process goes to Step S605, if no, the process goes to step S606.

In the embodiment, the handwriting display module 23 creates a substantially rectangular region 112 for closely bounding the handwritten input 111. The handwriting display module 23 further clears the handwritten input 111 from the input region 110 to make room for the stylus 30 to input a another handwritten input 111 into the input region 110.

In step S605, the determination 24 determines the string of letters associated with the handwritten input is a first portion of a word, and determines the string of letters associated with the another handwritten input is a last portion of the word, then the process goes to step S607.

In step S606, the determination 24 determines the string of letters associated to the handwritten input is a last portion of a word when there is a first portion right before it.

In step S607, the determination module 24 generates and displays a prompt on the touch screen 11 to prompt a user whether to combine a first handwritten input 111 and a second handwritten input 111, and further determines whether the user select an operation to combine the first portion of a word and a last portion of a word into a complete word; if yes, the process goes to step S608; if no, the process end.

In step S608: the combination module 27 combine the first portion and a second portion into a complete word and displays the letters of the first portion and the last portion on a non-input region of the touch screen 11 in a substantially same size.

In another embodiment, the combination module 27 reduces a space between the first portion and the second portion, and further adjusts the size of letters each of strings to ensure the each portion of a word to be displayed in a substantially same size. In an exemplary embodiment, the combination module 27 adjusts the size of the letters of the word to a predefined size to ensure the each portions of a word in a same size.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A handwriting input recognition system used for an electronic device having a touch screen, the handwriting input recognition system comprising:
   a touch recognition module, configured to recognize an initial touch point of a touch and handwritten inputs on the touch screen;
   an input region determination module, configured to determine an input region associated with the initial touch point;
   a handwriting display module, configured to control to display the input region, and display the recognized handwritten inputs in the input region;
   a letter recognition module, configured to recognize a string of letters associated with each of the handwritten inputs in the input region;
   a determination module, configured to determine whether one of the handwritten inputs reaches one boundary of the input region, and also determine whether the input region receives one other handwritten input during a predefined time duration if one of the handwritten inputs reaches the boundary of the input region, wherein the other handwritten input follows the one of the handwritten inputs which reached the boundary of the input region and there is no user operation between the following other handwritten input and the handwritten input which reached the boundary of the input region;
   the determination module being further configured to determine a string of letters which is associated with the handwritten input which reached the boundary of the input region is a first portion of a complete word and a string of letters associated with the other handwritten input is a last portion of the complete word if the input region receives the other handwritten input during the predefined time duration;
   a combination module, configured to combine the first portion and the last portion into a complete word and display letters of the first portion and the last portion in substantially same size.

2. The handwriting input recognition system as described in claim 1, wherein the handwriting display module is configured to create a substantially rectangular region associated for closely bounding the handwritten input and display the created rectangular region in the input region.

3. The handwriting input recognition system as described in claim 2, wherein combination module is configured to combine the first portion and the last portion into a complete word when the user selects an operation to combine the first portion and a last portion.

4. The handwriting input recognition system as described in claim 2, wherein the handwriting display module is configured to clear the handwritten input in the input region after the handwriting display module displays the string of letters in a non-input region of the touch screen.

5. The handwriting input recognition system as described in claim 2, wherein the handwriting display module is configured to calculate a maximum height and a maximum width of the handwritten input to create the rectangular region.

6. The handwriting input recognition system as described in claim 5, wherein the determination module is configured to determine the string of letters which is associated with the handwritten input which reached the boundary of the input region is a last portion of a complete word when there is a first portion right before it when the input region does not receive another handwritten input during the predefined time duration.

7. The handwriting input recognition system as described in claim 5, wherein the combining module is configured to reduce a space between the first portion and the last portion, and further adjust the size of letters of the first portion and the last portion to ensure the letters to be displayed in a substantially same size.

8. The handwriting input recognition system as described in claim 6, wherein the determination module is configured to generate and display a prompting information to prompt user to combine the first portion and the last portion into a complete word.

9. The handwriting input recognition system as described in claim 7, wherein the combination module is configured to adjust the size of the letters to a predefined size.

10. The handwriting input recognition system as described in claim 9, wherein the input region determination module is configured to determine the input region according to a predefined input region determining information.

11. An electronic device comprising:
a touch screen; and
a handwriting input system; wherein the handwriting input system comprises:
   a touch recognition module, configured to recognize an initial touch point of a touch and handwritten inputs on the touch screen;
   an input region determination module, configured to determine an input region associated with the initial touch point;
   a handwriting display module, configured to control to display the input region, and display the recognized handwritten inputs in the input region;
   a letter recognition module, configured to recognize a string of letters associated with each of the handwritten inputs in the input region;
a determination module, configured to determine whether one of the handwritten inputs reaches one boundary of the input region, and also determine whether the input region receives one other handwritten input during a predefined time duration if the one of the handwritten inputs reaches the boundary of the input region, wherein the other handwritten input is follows the one of the handwritten inputs which reached the boundary of the input region, and there is no user operation between the following other handwritten input and the handwritten input which reached the boundary of the input region;
the determination module being further configured to determine a string of letters which is associated with the handwritten input which reached the boundary of the input region is a first portion of a complete word and a string of letters associated with the other handwritten input is a last portion of the complete word if the input region receives the other handwritten input during the predefined time duration;
a combination module, configured to combine the first portion and the last portion into a complete word and display letters of the first portion and the last portion in a substantially same size.

12. The electronic device as described in claim 11, wherein the combination module is configured to reduce a space between the first portion and the last portion, and further adjust the size of letters of the first portion and the last portion to ensure the letters to be displayed in a substantially same size.

13. The electronic device as described in claim 12, wherein the determination module is configured to determine the string of letters associated to the handwritten input is a last portion when there is a first portion right before it when the input region does not receive another handwritten input during the predefined time duration.

14. The electronic device as described in claim 12, wherein the determination module is configured to generate and display a prompting information on the touch screen to prompt user to combine the first portion with the last portion to form a complete word, and to determine whether a user select an operation to combine the first portion and the last portion into a complete word.

15. The electronic device as described in claim 12, wherein the combination module is configured to combine the first portion and the last portion into a complete word when the user selects an operation to combine the first portion and the last portion.

16. The handwriting input recognizing method as described in claim 11, wherein further comprises a step: creating a rectangular region associated with a handwritten input in the input region for closely bounding the handwritten input and displaying the rectangular region.

17. The handwriting input recognizing method as described in claim 16, wherein the combining step further comprises:
reducing a space between the first portion and the last portion.

18. The handwriting input recognizing method as described in claim 16, wherein further comprising a step:
determining the string of letters associated to the handwritten input is a last portion when there is a first portion right before it and the input region does not receive another handwritten input during a predefined time duration.

19. The handwriting input recognizing method as described in claim 16, wherein further comprising a step:
generating and displaying a prompting information on the touch screen to prompt user whether to combine the first portion and a last portion into a complete word;
determining whether a user selects an operation to combine the first portion with a last portion into a complete word.

20. A handwriting input recognizing method applied to an electronic device having a touch screen, the method comprising:
recognizing an initial touch point of a touch on the touch screen;
determining an input region associated with the initial touch point;
displaying the input region on the touch screen;
recognizing and displaying a handwritten input in the input region;
determining whether one of the handwritten inputs reaches one boundary of the input region;
recognizing and displaying a string of letters associated with the handwritten inputs;
determining whether the input region receives one other handwritten input during a predefined time duration if there is one handwritten input reaches the boundary of the input region, wherein the other handwritten input follows the one of the handwritten inputs which reached the boundary of the input region, and there is no user operation between the other handwritten input and the handwritten input which reached the boundary of the input region;

determining the sting of letters which is associated with the handwritten input which reached the boundary of the input region is a first portion of a complete word, and the sting of letters associated with the other handwritten input is a last portion of the complete word if the input region receives the other handwritten input during a predefined time duration;

combining the first portion and the last portion into a complete word and displaying letters of the first portion and the last portion in a substantially same size.

* * * * *